Oct. 23, 1928.

C. E. KRAUS

ROTARY ENGINE

Filed Jan. 19, 1927

1,688,816

3 Sheets-Sheet 1

Inventor
Charles E. Kraus.
By Frank E. Liverance, Jr.
Attorney.

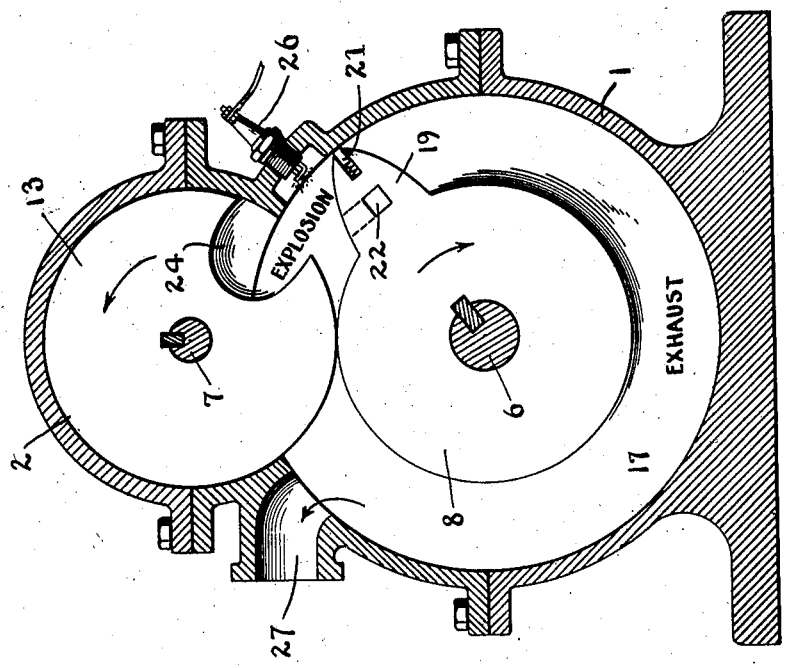
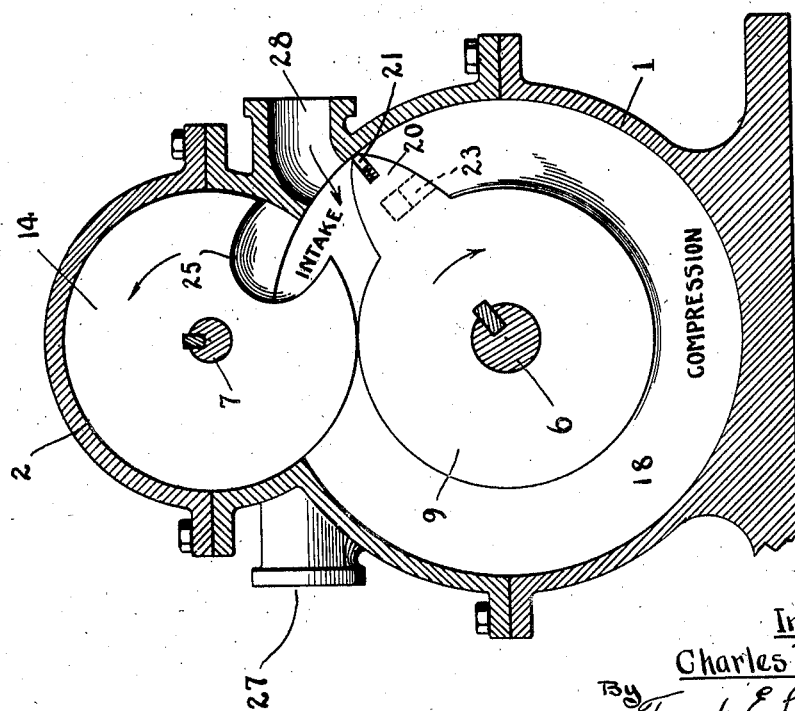

Oct. 23, 1928.
C. E. KRAUS
ROTARY ENGINE
Filed Jan. 19, 1927
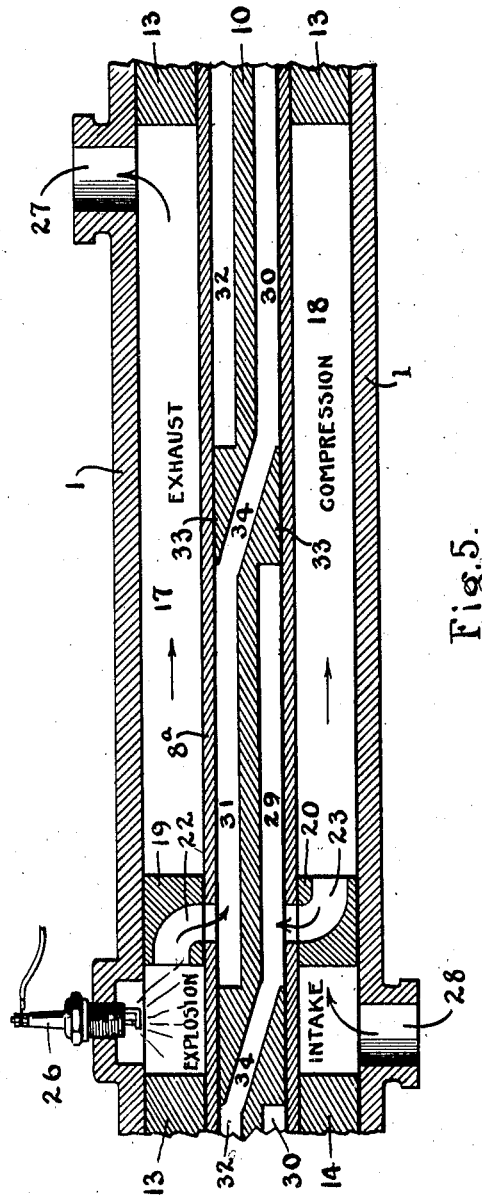
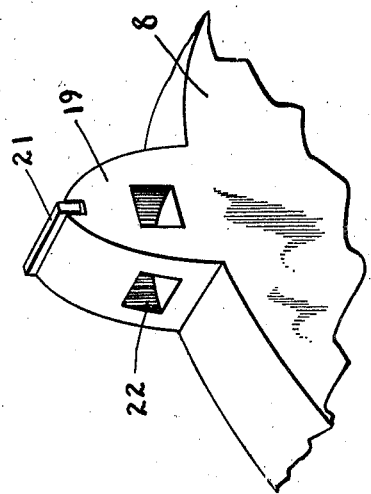
Inventor
Charles E. Kraus Patented Oct. 23, 1928.

1,688,816

UNITED STATES PATENT OFFICE.

CHARLES E. KRAUS, OF GRAND RAPIDS, MICHIGAN.

ROTARY ENGINE.

Application filed January 19, 1927. Serial No. 161,978.

This invention relates to improvements in rotary internal combustion engines. The principal feature of the invention is to provide an efficient engine of this type in which all of the moving parts are continuously rotative thereby eliminating vibration and loss of power resulting from the use of reciprocating or intermittently moving parts. A further object of the invention is to provide an engine which is comparatively simple in construction and the device is provided with various other novel features of construction and arrangement hereinafter more fully described and pointed out in the claims, reference being had to the accompanying drawings, in which, Fig. 1 is a longitudinal section elevation of an engine embodying this invention, the section being taken at axes of the two rotating shafts.

Figure 1:
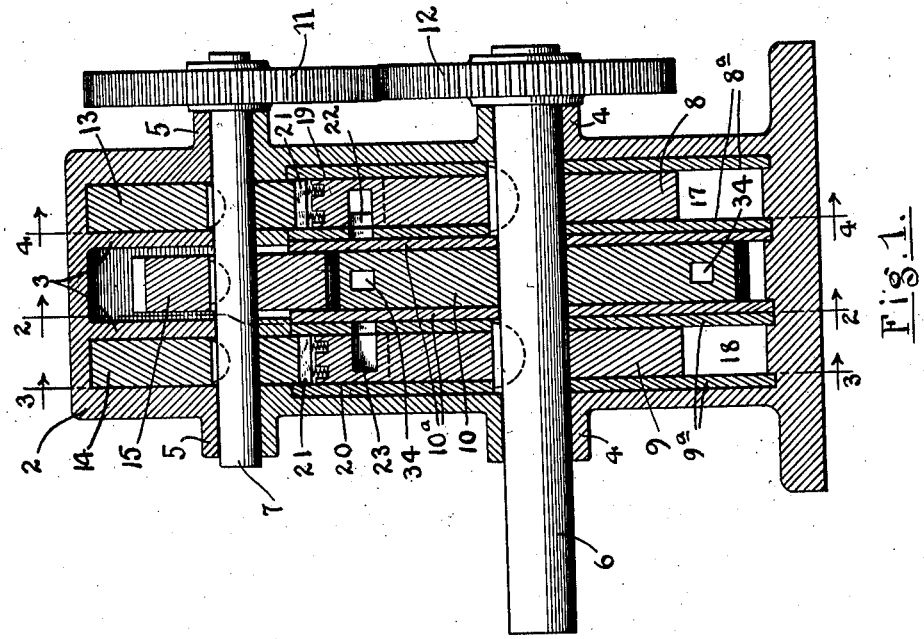
Figure 2:
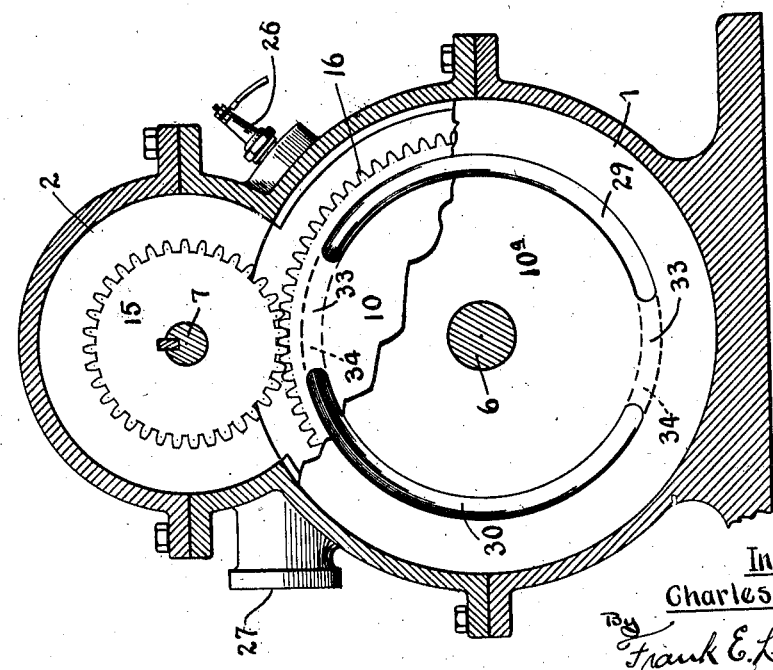

Figs. 2, 3 and 4 are each transverse sectional elevations of the same taken respectively on the lines 2—2, 3—3 and 4—4 of Fig. 1.

Fig. 5 is a diagrammatic view in the nature of a development of the annular chambers and parts associated therewith laid out on a flat surface, some of the parts being transposed and others omitted for clearness, and Fig. 6 is a fragmentary perspective of a portion of one of the rotors with its parted abutments.

Like reference characters refer to like parts in the different figures of the drawings.

The engine is provided with a casing of suitable construction, shaped to provide a lower cylinder 1 and an upper cylinder 2, the axes of which are parallel, and the two cylinders merging together. The upper cylinder is provided with partitions 3 by which it is divided into three cylindrical compartments. Bearings 4 and 5 are provided on the casing of each cylinder co-incident with the axis thereof, the lower bearings 4 being the support for the power shaft 6 of the engine and the upper bearings 5 supporting the auxiliary shaft 7.

Within the lower cylinder 1 are arranged the power rotor 8, the compression rotor 9, and the rotor 10. Each rotor is provided at both of its respective sides with circular plates 8ª, 9ª and 10ª, respectively, these plates being attached by suitable means to their respective rotors and serving as flanges therefor. These three rotors and their plates are mounted on the power shaft 6, the power rotor 8 and the compression rotor 9 being keyed to the shaft and caused to rotate with it while the transfer rotor and its plates located between the rotors 8 and 9 are rotatably mounted upon the shaft 6.

The auxiliary shaft 7 is rotated simultaneously with the power shaft 6 by means of the gears 11 and 12 fixed to the respective shafts, these gears being of the same diameter and causing both shafts to rotate at the same speed. The auxiliary shaft 7 carries two rotating abutments 13 and 14 and a gear 15, each located in one of the cylindrical compartments of the cylinder 2 and all keyed to the shaft 7 and rotating with it. The rotating abutments 13 and 14 are of the same diameter as the rotors 8 and 9 and are in peripheral engagement respectively therewith, while the transfer rotor 10 is provided on its periphery with a gear 16, the diameter of which is twice that of the gear 15 and meshes therewith. By this arrangement, it will be seen that when the shafts rotate the members 8 and 13, and 9 and 14 will turn with their peripheries in engagement and rotating at the same speed while the transfer rotor 10 will be rotated by the gear 15 in the same direction as the rotors 8 and 9 but at half the speed thereof.

The rotors 8 and 9 are each smaller in diameter than the cylinder 1 and thereby the annular chambers 17 and 18 are provided respectively between the peripheries of the rotors and the inner walls of the cylinder 1. Each of the rotors is provided with a radially extending vane 19 and 20, the outer edge of which has a spring actuated bar 21 held in frictional engagement with the cylinder wall to prevent the passage of gas from one side of the vane to the other at this point. The vane 19 on the power rotor 8 has a port 22 opening at the inner side of the vane and also at the face of the vane rearward relative to the direction of rotation and the vane 20 on the compression rotor 9 has a port 23 opening at the inner face thereof and also at the side of the vane forward relative to the direction of rotation. The direction of rotation is indicated by arrows on Figs. 3 and 4 of the drawings. Each of the abutments 13 and 14 is provided respectively with a pocket 24 and 25 on its periphery properly shaped to receive the respective vane 19 or 20 as the members rotate, the walls of these pockets being so shaped that the radial edge of the vane, in which is mounted the bar 21, will closely engage it during the rotation and prevent the passage of gas past the abutment.

The chamber 17 is the explosion chamber and the chamber 18 the compression chamber. By means of the structure described and best illustrated in Figs. 3 and 4 it will be seen that each chamber is arc shaped, the annulus being divided by the abutments 13 and 14 which, in each case, bear peripherally against the respective rotors 8 and 9 and prevent the passage of gas between them. The explosion chamber 17 is provided near the abutment 13 and on what may be called the explosion side thereof, with an ignition device, preferably the ordinary spark plug 26, and at the other or exhaust side of the abutment 13 the chamber has an outlet passage 27. The compression chamber has an intake passage 28 under the abutment 14 and at the same side as the spark plug 26.

Each flat side of the transfer rotor 10 is provided with two arcuate pockets or chambers 29, 30, 31 and 32, the chambers on each side being separated by diametrically opposite blank spaces 33. Each arc shaped chamber of one side of the disc is connected with the diametrically opposite arc shaped chamber of the other side of the disc by a passage 34 as, for instance, the chamber 29 with the chamber 32 and the chamber 30 with the chamber 31. The plates 10$^a$ have similar and corresponding arcuate slots and inasmuch as the plates and the rotor are fixed together each arcuate slot in the plate and the corresponding arcuate chamber in the rotor may be considered as one. The radius of the chambers is coincident with the ports 22$^a$ and 23$^a$ and during the operation of the engine the ports register with the chambers.

As the engine operates the first rotation draws a charge of combustible gas through the intake passage 28 and into the compression chamber 18. After completing one revolution and filling the compression chamber with gas the vane 20 travels by the abutment 13 through the pocket 25 and the charge of gas then being trapped in the compression chamber, is compressed ahead of the vane 20 as it rotates in the next revolution. This gas finds its way through the port 23 and into one of the arc shaped chambers 29 or 30 in the transfer rotor 10 and through the passage 34 into the diametrically opposite chamber 31 on the other side of the rotor. It will be noted that while a chamber 30 is in communication with the port 23 its diametrically opposite companion chamber on the other side of the rotor is closed. It is to be remembered here that the transfer rotor is rotating at half the speed of the compression rotor. The length of the chamber in the transfer rotor is such that the port 23 will remain in communication with it until the vane 20 enters the pocket 25 in the abutment 14. The blank spaces 33 between the arcuate chambers are of the proper length to cover the port 23 during the passage of the vane 20 from one side of the abutment 14 to the other through the pocket 25 thereof and owing to the difference in speed between the vane 20 and the rotor 10, when the vane 20 emerges on the opposite side of the abutment 14, the port 23 will register with the arcuate chamber diametrically opposite the one with which it registered on the former rotation.

During the operation of the compression rotor just described the power rotor 8 is performing an analogous operation, its vane 19 passing by the abutment 13 through the pocket 34 and its port 22 engaging at each rotation with alternate arcuate chambers in the transfer rotors.

After the gas has been compressed in the diametrically opposite chambers on opposite sides of the rotor it enters the explosion chamber 17 through the port 22 as said port registers with the chamber of the transfer rotor when the vane 19 emerges from the pocket of the abutment 13 and as soon as the vane 19 has passed the spark plug 26 the compressed gas which is partly in the explosion chamber but largely in the chambers of the transfer rotor is ignited and explodes, this being the power impulse of the engine. As the power rotor rotates the gas ahead of the vane 19, which was exploded at the previous rotation, is expelled through the exhaust passage 27. The port 22 remains in communication with the arcuate chamber in the transfer rotor until the vane 19 reaches the abutment 13 whereat the port 22 passes across the blank space 33 and when the vane 19 leaves the abutment 13 the port 22 will register with the diametrically opposite chamber of the transfer rotor, this being the chamber which contains a fresh charge of gas compressed by the compression rotor during the preceding rotation.

It will be seen from the foregoing description that the motor receives an explosive impulse at each revolution and that during each revolution the burned gas from the preceding revolution is discharged and that a fresh charge of gas is drawn in and compressed by the compression rotor. The compressed charge is transferred to the chambers and passages in the transfer rotor to the explosion chamber utilizing alternately each connected and diametrically opposite pair of chambers in the transfer rotor at each rotation.

It is to be understood that the particular casing shown by the drawings is diagrammatic in nature and that suitable lubricating means will be provided and such devices as necessary to prevent the passage of gases between the joints will be applied.

It will be seen that every moving part of the motor is a continuously rotating part. The complete absence of any reciprocating or intermittently moving member insures a smooth running motor and one in which loss of power absorbed by reciprocating parts is entirely absent. The speed of the motor will be limited only by the inertia of the gases entering the compression chamber and passing through the transfer chamber into the explosion chamber.

I claim:

1. A rotary internal combustion engine comprising, an explosion chamber and a compression chamber, a shaft extending through both of said chambers, a power rotor fixed to said shaft in said explosion chamber, a compression rotor fixed to said shaft in said compression chamber, means on the compression rotor to compress the gas in the compression chamber, a transfer member having a plurality of chambers, each of which is adapted, by movement of the transfer member, to receive compressed gas from the compression chamber at one revolution of the rotors and to communicate with and deliver said compressed gas to the explosion chamber at the next succeeding revolution, means for igniting the gas in the explosion chamber, means on the power rotor acted upon by the exploded gas to rotate said rotor, and means for discharging the burned gas from the explosion chamber.

2. A rotary internal combustion engine comprising, an explosion chamber and a compression chamber, a shaft extending through both of said chambers, a power rotor on said shaft in said explosion chamber, a compression rotor on said shaft in said compression chamber, means for admitting gas to the compression chamber, means on the compression rotor to compress the gas in the compression chamber, a transfer member having a plurality of chambers, each of which, in succession, communicates with the compression chamber during a compression movement of the compression rotor and then communicates with the explosion chamber during a succeeding movement of the power rotor, means for igniting gas in the explosion chamber, means on the power rotor acted upon by the exploded gas to rotate the power rotor, and means for discharging the burned gas from the explosion chamber.

3. A rotary internal combustion engine comprising, an explosion chamber, and a compression chamber, a shaft extending through both of said chambers, a power rotor fixed to said shaft in said explosion chamber and having a port from its lateral side into the explosion chamber, a compression rotor fixed to said shaft in said compression chamber and having a port from its lateral side into the compression chamber, means for admitting gas to the compression chamber, means on the compression rotor for compressing said gas, a transfer member located between said rotors and having a chamber therein, means for moving said transfer member whereby the chamber therein will register with the port of the compression rotor during a compression movement thereof, and will register with the port of the power rotor during a succeeding power movement thereof.

4. A rotary internal combustion engine comprising, an explosion chamber and a compression chamber, a shaft extending through both of said chambers, a power rotor fixed to said shaft in said explosion chamber, and having a port from a lateral side to said explosion chamber, a compression rotor fixed to said shaft in said compression chamber and having a port from a lateral side into said compression chamber, means on the compression rotor for compressing the gas, a transfer member between said rotors and having a plurality of chambers, means for moving said transfer member whereby each of its chambers will successively register with the port in the compression chamber during a compression movement thereof and will then register with the port of the power rotor during a succeeding power movement thereof, means for igniting the gas in the explosion chamber, means on the power rotor acted upon by the exploded gas to rotate the same, and means for discharging the burned gas from the explosion chamber.

5. A rotary internal combustion engine comprising, an explosion chamber and a compression chamber, a shaft extending through both of said chambers, a power rotor fixed to said shaft in said explosion chamber and having a port from a lateral side into said explosion chamber, a compression rotor fixed to the shaft in said compression chamber and having a port from a lateral side into said compression chamber, means for admitting gas to the compression chamber, means on the power rotor to compress said gas by rotation of the rotor, a transfer member between said rotors and rotatably mounted on said shaft and having a plurality of chambers, means for rotating said transfer member relative to said rotors whereby each of its chambers will successively register with the port in the compression rotor during a compression rotation and will then register with the port of the power rotor during a succeeding power rotation, means for igniting the gas in the explosion chamber, means on the power rotor acted upon by the exploded gas to rotate the same, and means for discharging the burned gas from the explosion chamber.

6. A rotary internal combustion engine comprising, an explosion chamber and a compression chamber, a shaft extending through both of said chambers, a power rotor fixed to said shaft in said explosion chamber and having a port from a lateral side into said explosion chamber, a compression rotor fixed to the shaft in said compression chamber and having a port from a lateral side into said compression chamber, means for admitting gas to the compression chamber, means on the power rotor to compress said gas by rotation of the rotor, a transfer member rotatably mounted on said shaft between said rotors, and having a plurality of chambers, means for rotating said transfer member in the same direction as the rotors but at a different speed whereby each of the chambers of the transfer member will successively register with the port of the compression chamber during a compression rotation and then with the port of the power rotor during a succeeding power rotation, means for igniting the gas in the explosion chamber, means on the power rotor acted upon by the exploded gas to rotate the same, and means for discharging the burned gas from the explosion chamber.

7. A rotary internal combustion engine comprising, a shaft having a power rotor and a compression rotor fixed thereto in spaced apart relation, an explosion chamber surrounding the periphery of the power rotor, a compression chamber surrounding the periphery of the compression rotor, a vane extending radially from each rotor into its respective chamber, means extending into each chamber to divide the same, said means including means to permit passage of the vane, a port communicating with a lateral face of the power rotor and with the explosion chamber in the rear of the vane relative to the direction of rotation, a port in the compression rotor communicating with a lateral face thereof and with the compression chamber forward of the vane relative to the direction of rotation, means for admitting gas to the compression chamber, a transfer member rotatably mounted on said shaft between said rotors and having a plurality of chambers, means for rotating said transfer member relative to said rotors whereby each of its chambers will successively communicate, first with the port of the compression rotor during a compression rotation and next with the port of the power rotor during a succeeding power rotation, means for igniting the gas in the explosion chamber, and means for exhausting the gas from the explosion chamber.

8. A rotary internal combustion engine comprising, a shaft having a power rotor and a compression rotor fixed thereto in spaced apart relation, an explosion chamber surrounding the periphery of the compression rotor, a vane extending radially from each rotor into its respective chamber, means extending into each chamber to divide the same, said means including means to permit passage of the vane, a port communicating with a lateral face of the power rotor and with the explosion chamber in the rear of the vane relative to the direction of rotation, a port in the compression rotor communicating with a lateral face thereof and with the compression chamber forward of the vane relative to the direction of rotation, means for admitting gas to the compression chamber, a transfer member rotatably mounted between said rotors and having a plurality of chambers, means for rotating said transfer member in the same direction as the rotation of the rotors but at a different speed whereby each of its chambers will successively communicate, first with the port of the compression rotor during a compression rotation and next with the port of the power rotor during a succeeding power rotation, means for igniting the gas in the explosion chamber, and means for exhausting the gas from the explosion chamber.

9. A rotary internal combustion engine comprising, a shaft having a power rotor and a compression rotor fixed thereto in spaced apart relation, an explosion chamber surrounding the periphery of the power rotor, a compression chamber surrounding the periphery of the compression rotor, a vane extending radially from each rotor into its respective chamber, means extending into each chamber to divide the same, said means including means to permit passage of the vane, a port communicating with a lateral face of the power rotor and with the explosion chamber in the rear of the vane relative to the direction of rotation, a port in the compression rotor communicating with a lateral face thereof and with the compression chamber forward of the vane relative to the direction of rotation, means for admitting gas to the compression chamber, a transfer member rotatably mounted on said shaft between said rotors and having two arcuate chambers in each of its lateral sides and a passage connecting each arcuate chamber on one side with the diametrically opposite arcuate chamber of the opposite side, means for rotating said transfer member whereby each of its arcuate chambers on one side will successively register with the port of the compression chamber during alternate rotations and the arcuate ports on its opposite side will successively register with the port of the power rotor during succeeding alternate rotations, means for igniting the gas in the explosion chamber, and means for exhausting the gas.

10. A rotary internal combustion engine comprising, a power shaft, a power rotor and a compression rotor fixed at spaced apart relation to said power shaft, an explosion chamber surrounding the power rotor and a compression chamber surrounding the compression rotor, a vane on each rotor extending into its respective chamber, a transfer rotor rotatably mounted on said power shaft between said power and compression rotors, and having two arcuate chambers in each of its lateral sides and a passage connecting each arcuate chamber on one side with the diametrically opposite arcuate chamber on the other side, a port in the power rotor extending from its lateral side into the explosion chamber rearward of the vane relative to the direction of rotation, a port on the compression rotor extending from its lateral side into the compression chamber forward of the vane relative to the direction of rotation, an auxiliary shaft, means for rotating the auxiliary shaft simultaneously with the power shaft, a rotary abutment in peripheral engagement with each of said power and compression rotors and fixed to said auxiliary shaft, each of said dividing abutments having a pocket to receive and permit passage of the vane, a gear on said transfer rotor, a gear fixed to said auxiliary shaft and meshing with said gear on said transfer rotor, whereby the transfer rotor is rotated to successively register each of its arcuate chambers on one side with the port of the compression rotor during alternate cycles of rotation and to successively register the arcuate chambers of its opposite side with the port of the power rotor during alternate cycles of rotation, means for admitting gas to the compression chamber, means for igniting the gas in the explosion chamber, and means for exhausting the gas therefrom.

In testimony whereof I affix my signature.

CHARLES E. KRAUS.